(12) United States Patent  
Roodenburg et al.

(10) Patent No.: US 10,047,878 B2  
(45) Date of Patent: Aug. 14, 2018

(54) MARINE PIPELINE INSTALLATION VESSEL AND METHOD FOR LAYING AN OFFSHORE RIGID PIPELINE IN THE SEA

(71) Applicant: ITREC B.V., Schiedam (NL)

(72) Inventors: Joop Roodenburg, Schiedam (NL); Terence Willem August Vehmeijer, Schiedam (NL); Ronny Lambertus Waltherus Nouwens, Schiedam (NL); Jeroen Adrianus Joseph Donkers, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 15/512,335

(22) PCT Filed: Sep. 17, 2015

(86) PCT No.: PCT/EP2015/071315  
§ 371 (c)(1),  
(2) Date: Mar. 17, 2017

(87) PCT Pub. No.: WO2016/042071  
PCT Pub. Date: Mar. 24, 2016

(65) Prior Publication Data  
US 2017/0248252 A1  Aug. 31, 2017

(30) Foreign Application Priority Data  
Sep. 19, 2014  (NL) ..................................... 2013497

(51) Int. Cl.  
*F16L 1/20*  (2006.01)  
*B63B 35/03*  (2006.01)  
(Continued)

(52) U.S. Cl.  
CPC .............. *F16L 1/203* (2013.01); *B63B 35/03* (2013.01); *B65H 75/425* (2013.01);  
(Continued)

(58) Field of Classification Search  
CPC ..... F16L 1/203; F16L 1/19; F16L 1/23; F16L 1/207; F16L 1/205; B63B 35/03;  
(Continued)

(56) References Cited

U.S. PATENT DOCUMENTS 4,260,287 A  4/1981 Uyeda et al.  
4,345,855 A  8/1982 Uyeda et al.  
(Continued)

FOREIGN PATENT DOCUMENTS

| | | | |
|---|---|---|---|
| EP | 2 578 913 A1 | 4/2013 | |
| FR | 2 792 990 A1 | 11/2000 | |
| GB | 2 199 632 A | 7/1988 | |

*Primary Examiner* — Carib A Oquendo  
(74) *Attorney, Agent, or Firm* — Birch, Stewart, Kolasch & Birch, LLP

(57) ABSTRACT

A marine pipeline installation vessel and a method are provided for laying an offshore rigid pipeline in the sea, the vessel at least being adapted to carry out the rigid reel lay method. The vessel includes at least one vertical storage reel for the storage of a spooled rigid pipeline. A left and right reel support structure are provided to support the weight of the at least one storage reel. The left and right support structures are embodied to form a pivoting structure allowing an angular adjustment of the horizontal reel axis about a vertical axis to alter the angular position of the at least one storage reel.

15 Claims, 8 Drawing Sheets

(51) Int. Cl.
  *F16L 1/19* (2006.01)
  *F16L 1/23* (2006.01)
  *B65H 75/42* (2006.01)
  *B65H 75/44* (2006.01)

(52) U.S. Cl.
  CPC .......... B65H 75/4402 (2013.01); *F16L 1/19* (2013.01); *F16L 1/205* (2013.01); *F16L 1/207* (2013.01); *F16L 1/23* (2013.01); *B65H 2701/33* (2013.01)

(58) Field of Classification Search
  CPC .............. B65H 2701/33; B65H 75/425; B65H 75/4402; E21B 19/22; H02G 1/10
  See application file for complete search history.

(56) References Cited

U.S. PATENT DOCUMENTS

| | | | | |
|---|---|---|---|---|
| 4,346,843 | A | * | 8/1982 | Long .................... A01G 25/095 137/615 |
| 4,687,376 | A | | 8/1987 | Recalde |
| 4,789,108 | A | | 12/1988 | Recalde |
| 5,573,353 | A | * | 11/1996 | Recalde .................... F16L 1/19 405/168.1 |
| 6,371,694 | B1 | | 4/2002 | de Varax et al. |
| 2003/0044234 | A1 | | 3/2003 | Stockstill |
| 2011/0013988 | A1 | * | 1/2011 | Wilson ...................... F16L 1/18 405/168.3 |
| 2012/0020739 | A1 | * | 1/2012 | Lyngberg ................ F16L 1/18 405/166 |
| 2015/0298773 | A1 | * | 10/2015 | Baylot .................... B63B 27/30 405/158 |
| 2016/0185565 | A1 | * | 6/2016 | Tiberio .................. B65H 49/32 414/800 |

\* cited by examiner

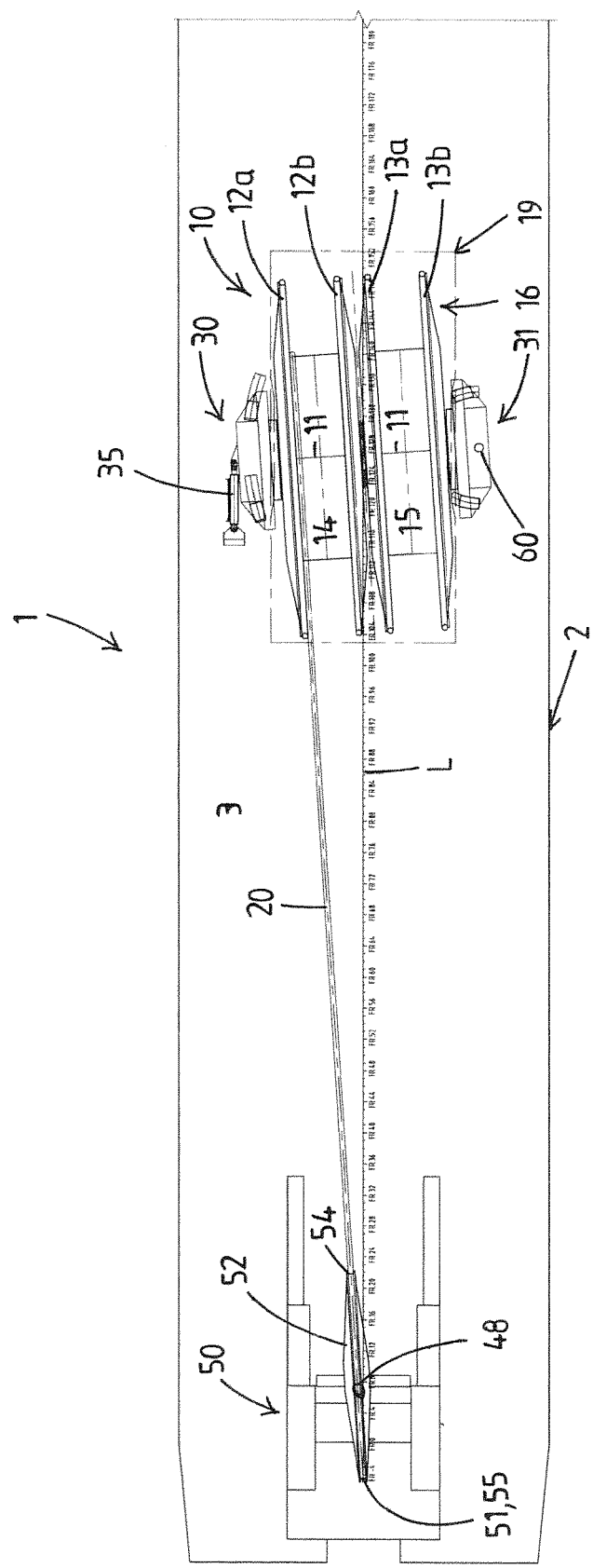

MARINE PIPELINE INSTALLATION VESSEL AND METHOD FOR LAYING AN OFFSHORE RIGID PIPELINE IN THE SEA

The present invention relates to a marine pipeline installation vessel for laying an offshore rigid pipeline on the seabed, said vessel at least being adapted to carry out the rigid reel lay method. More particularly, the present invention relates to an improved vessel and method for laying a rigid pipeline, wherein a specially configured vessel provides a hull and a deck and at least one vertical storage reel for the storage of a spooled rigid pipeline to be laid, which storage reel is rotatable about a horizontal reel axis.

Reel type pipelaying vessels are typically employed in deep water situations. Such pipelaying vessels have been built by the applicant for many years now and usually include at least one vertical storage reel, a left and right reel support structure, a pipeline launch assembly comprising a pipeline guide, a straightener, tensioner and pipeline support device to be able to lay the offshore rigid pipeline into the body of water towards the floor of the body of water.

The storage reel of the vessel according to the invention is rotatable about a horizontal reel axis and comprises a left and right vertical flange between which a hub extends, in a traverse direction. Onto the hub multiple layers, each comprising several windings of pipeline can be stored. The weight of the at least one storage reel is supported by a left and right reel support structure, which together define the horizontal reel axis. The left and right support structures are supported by the vessel. Commonly, a storage reel drive is provided to rotate the storage reel.

As is common for this type of pipeline installation vessels, a pipeline launch assembly is mounted to the vessel, downstream of the reel in the direction of unspooling. The pipeline launch assembly is adapted to launch the unwound pipeline in a firing line into the sea. The pipeline launch assembly comprises a pipeline guide having an elongated pipeline guide member orientated essentially in the direction of the storage reel and providing an essentially circular or semi-circular pipeline guide surface, which pipeline guide is adapted to guide unwounded pipeline from the storage reel over the pipeline guide into the firing line, wherein said pipeline contacts the pipeline guide member at a guide contact point upstream of the firing line and departs said member at a guide departure point into the firing line.

Also commonly applied when handling rigid pipelines are:
- a straightener provided downstream of the storage reel in the direction of unspooling to provide straightening to the rigid pipeline.
- at least one tensioner provided downstream of the pipeline guide which is adapted for engaging the pipeline in the firing line and supporting at least part of the weight of the launched pipeline to control the rate of laying of the rigid pipeline on the seabed,
- a pipeline support device adapted to support the weight of the launched pipeline in the firing line.

In order to promote proper unwinding of a pipeline, also referred to as unspooling of the rigid pipeline from the storage reel to the pipeline guide, the pipeline departing angle is preferably essentially 90°, wherein the pipeline departing angle is defined by the angle between the unspooling direction of a winding of pipeline from the hub and the horizontal reel axis. For a system comprising a storage reel and pipeline guide, left and right fleet angles can be defined to determine the spooling and unspooling quality of the storage reel. The left and right fleet angle are defined as the angle between a first line drawn from the guide departure point to the storage reel, perpendicular to the reel axis, and a second line drawn from the guide departure point to the left and right flange, respectively. Advantageously, the left and right fleet angles do not exceed 7.5°, preferably not larger than 5.5°. The larger the fleet angles, the poorer the spooling and unspooling, which may damage the pipeline through crushing and abrasion.

Accordingly, for a given maximum allowable fleet angle and a given distance between storage reel and pipeline guide, determined by the vessel dimensions, the distance between the hubs is limited. Thereby, the amount of pipeline that can be laid is limited.

In order to increase the vessel capacity, in particular to be able to store more pipeline, in the past systems were invented comprising storage reels having a broader hub, thus capable to store more pipeline. To keep the fleet angles acceptable, the fleet angle was adjusted by allowing the pipeline guide, with the launch assembly, to translate over a distance during unspooling the pipeline from the storage reel. See e.g. FIG. 4 of US2003/0044234 (Stockstill), FIG. 18 of U.S. Pat. No. 4,345,855 (Santa Fe) and FIG. 41 of U.S. Pat. No. 4,687,376 (Santa Fe). A translation of the pipeline guide results in a translation of the pipeline guide departure point and thus results in an adjustment of the fleet angle. In particular, the position of the pipeline guide is adjustable between a far right position in which the left fleet angle is minimized, preferably to zero (left flange is in line with the guide contact point and the guide departure point), and a far left position in which the right fleet angle is minimized, preferably to zero (right flange is in line with the guide contact point and the guide departure point). See e.g. FIG. 2 of U.S. Pat. No. 4,345,855.

An alternative solution to increase the capacity of a vessel is presented in U.S. Pat. No. 6,371,694 (Coflexip, realized in the Deep Blue vessel owned by Technip). Rather than increasing the dimensions of a single storage reel, here two (relatively narrow) adjacent storage reels are provided in an angular position, the mid-planes of the wheels intersecting in the vertical longitudinal mid-plane of the vessel.

A storage reel for rigid pipelines easily weighs about 700 metric tons and depending on the pipe diameter can store several kilometers of pipeline. For instance using a 25 meter diameter reel, the reel is able to store 7.5 km of pipeline with a pipe diameter of 16 inches or 80 km of pipeline with a pipe diameter of 4 inches. In total, a filled reel, i.e. a reel including pipeline to be laid, may weigh up to 2500 to 4000 metric tons. E.g., U.S. Pat. No. 4,345,855 discloses that the reel ship of the invention may offload 2000 tons of pipeline. The Deep Blue pipelaying vessel referred to above is equipped with twin reels of 2800 metric tons each.

U.S. Pat. No. 4,687,376 also discloses translatable auxiliary storage reels for pipelines. These storage reels are supported on so-called 'spooling track assemblies' providing for a transverse movement of a storage reel between port and starboard positions, as visible in FIG. 2 and FIG. 20. It is noticed that such a translation is only possible with storage reels having a relatively small width, and with reels having a smaller capacity, as can be derived e.g. from FIG. 1 of U.S. Pat. No. 4,687,376.

The aim of the present invention is to provide an alternative solution to increase the vessel capacity, in particular to be able to store more pipeline. According to the invention, this is accomplished in that the left and right support structures are embodied to form a pivoting structure allowing an angular adjustment of the horizontal reel axis about a vertical axis to alter the angular position of the at least one storage reel, and wherein at least one support structure drive is provided to controllably adjust the angular position about said vertical axis.

The effect of this pivoting structure is that the angular position of the storage reel, in particular of a storage reel having very large dimensions and weight, is adjustable.

An advantage of a pivoting structure is that the centre of gravity of the at least one storage reel can be kept essentially stationary during pivoting: whereas during translation of a storage reel the centre of gravity of the reel translates as much as the reel, with a pivoting motion the centre of gravity can be unchanged if it coincides with the vertical pivot axis of the horizontal reel axis.

Another advantage is that the vessel space required for a storage reel of which the angular position is adjustable requires only a little bit of additional vessel space when compared to a stationary storage reel. The angular position of a storage reel having very large dimensions can be made adjustable, without requiring a significant increased footprint. The same advantage of the angular position of the storage reels is thus obtained as realized in the Deep Blue, at a relatively reduced width of the vessel.

With the pivoting structure of the present invention, the angular position of the storage reel can be altered for two reasons. The angular position of the storage reel can be altered in order to coordinate with the storage reel rotation, thus spooling the pipeline upon the storage reel or removing the pipeline from the reel in an orderly fashion. An improved spooling performance can be obtained, e.g. in terms of efficiency and/or accuracy. It allows the rigid pipeline to be distributed evenly over the storage reel.

Secondly, the horizontal reel axis can be adjusted in order to align the pipeline launch assembly with a first or second storage reel, or a left or right storage reel section, as selected by the vessel operators. In other words, during spooling, it is both conceivable that the storage reel is positioned in an optimal angular position with respect to the spooling facility, i.e. an optimum static position, as well as that the angular position of the storage reel is adjustable in an oscillating motion during spooling, i.e. a dynamically adjustable position.

According to the invention, the left and right support structures are supported by the vessel and embodied to form a pivoting structure allowing an angular adjustment of the horizontal reel axis about a vertical axis to alter the angular position of the at least one storage reel. In embodiments, the left and/or right support structure is movably supported by the vessel, preferably simultaneously. The consequential angular adjustment of the horizontal reel axis occurs about a swivel axis between the left and right support structure. Alternatively, embodiments are conceivable wherein only the left or right support structure is moveable, while the other support structure enables the pivot and angular adjustment of the horizontal reel. The horizontal reel axis consequently swivels about a swivel axis adjacent the other support structure.

In embodiments, the left and/or right support structure are movably supported by the vessel so as to form a pivot connection. It is conceivable that one or both support structures are embodied as skid carts, that are movably supported by the vessel, e.g. by rails provided on the vessel. Alternatively, it is conceivable that a linkage is provided between one or both support structures and the vessel, that allow movement of the left and right support structures to form a pivoting structure allowing an angular adjustment of the horizontal reel axis.

In embodiments, the horizontal reel axis is generally transverse to the longitudinal axis of the vessel (L).

Embodiments are conceivable comprising multiple left and right support structures, each supporting one or more storage reels, which are provided behind each other on the vessel, as seen in the direction of the longitudinal axis of the vessel. Accordingly, more (types of) pipeline can be stored on the vessel.

According to the invention, at least one support structure drive is provided. Each support structure may comprise a corresponding drive. Alternatively, there is one support structure drive that primes one or both support structures. Advantageously, a support structure drive control is provided to adjust the support structure(s), during spooling and/or unspooling. Advantageously, the angular position of a storage reel is in in line with the longitudinal axis of the vessel during spooling.

In embodiments, the left and right reel support structure is embodied as a support frame, e.g. embodied as a cart. It is conceivable that the reel support structures support opposed ends of a storage reel support axle, but also that just protruding flange portions are being supported. The support frame may, for example, be movable along curved rails provided on the vessel, or, alternatively, a horizontal bearing may be provided between the support frame and the vessel In another conceivable embodiment the left and right reel support structure are formed by opposed ends of a storage reel support axle. The support axle may rotate together with the support reel, e.g. the support axle is supported directly by bearing surfaces on the vessel, to form a pivoting structure. Alternatively, the support axle comprises square or polygonal ends and provide bearing surfaces for the storage reel to rotate about.

In embodiments, the angular position of a storage reel is adjustable between a far right angular position and a far left angular position. In the far right angular position, the left fleet angle is minimized, preferably to zero. In this angular position of the storage reel the left flange is in line with the guide contact point and the guide departure point of the pipeline guide. Analogously, in the far left angular position, the right fleet angle is minimized, preferably to zero. In this angular position, the right flange is in line with the guide contact point and the guide departure point. It is conceivable that an optimum angular position of the storage reel is first determined and then set during pipelaying.

In embodiments, two or more storage reels are provided, which are preferably independently rotatable. The two or more storage reels are jointly supported by the left and right reel support structures. an angular adjustment of the horizontal reel axis is allowed between a first angular position of the storage reel in which the fleet angles of the first storage reel are set to a minimum, and a second angular position of the storage reel in which the fleet angles of the second storage reel are set to a minimum. Possibly, a third and $n^{th}$ angular position of the storage reel are also possible in which the fleet angles of the third and $n^{th}$ reel are set to a minimum.

In embodiments, an active support structure drive control is provided, which is adapted to continuously alter the angular position of the storage reel(s) during spooling and/or unspooling the pipeline onto and/or from the storage reel, resulting in an oscillating motion of the storage reel. It is thus enabled to continuously vary the angular position of the storage reel during pipelaying, which is advantageously in view of proper spooling and unspooling of a pipeline.

As indicated above, in embodiments, two or possibly even more storage reels are provided. Each storage reel may carry a different pipeline. Advantageously, the storage reels are independently rotatable. This prevents the unnecessary rotation of a storage reel that is not to be unspooled in the set angular position of the horizontal reel axis. In addition, it is both possible to spool pipelines onto the storage reels independently and in parallel.

Possibly, the storage reels are jointly supported by the left and right reel support structures via a common support axle.

Alternatively or in addition to the common support axle, storage reels may be provided that are mutually connected via a vertical bearing, allowing both storage reels to be independently rotatable about the common horizontal reel axis. For example, the right flange of the left storage reel is positioned adjacent the left flange of the right storage reel. Between these flanges a bearing having a large diameter, e.g. 70-95% of that of the flanges may be provided. The advantage of such an embodiment comprising flanges is that a support axle may be redundant and even dispensed with. Another advantage, also with a common support axle, is the improved strength of the overall construction as the bearing possibly attributes to the strength of the elongated flanges.

In yet alternative embodiments, one storage reel is provided comprising an intermediate flange, defining a left and a right hub portion of the storage reel. Possibly, the intermediate flange is removable. Different pipelines or different types of pipeline may be stored on the left and right hub portion.

Either way, according to the invention, the left and right support structures allow an angular adjustment of the horizontal reel axis. Advantageously, an angular adjustment of the horizontal reel axis is allowed between a first angular position of the storage reel in which the fleet angles of the first storage reel or of the left hub portion are set to a minimum, and a second angular position of the storage reel in which the fleet angles of the second storage reel or of the right hub portion are set to a minimum. In embodiments, the horizontal reel axis is set into the first angular position of the storage reel, and only altered to switch to the second angular position of the storage reel. It is also conceivable that the angular position of the storage reel is dynamically altered during pipe laying in order to coordinate with the storage reel rotation.

The left and right vertical flange of the storage reel, and possibly also the intermediate flange, may be very large. A diameter of 30-50 meters is conceivable. To be able for a flange having such a large dimension, without having an unacceptable thickness, reinforced flanges may be applied. The reinforcement can be achieved either by a choice of material or by designing a reinforced structure.

In embodiments, the left and/or right support structure is also embodied to provide an upward translational movement of one or both ends of the horizontal reel axis. Accordingly, the horizontal reel axis is (in addition to the pivot about a vertical axis according to the invention) allowed to pivot about an horizontal axis in line with the storage reel from the horizontal position to an inclined position. An inclined position of the storage reel axis may be particularly advantageous in vessel configurations where the reel is positioned relatively close to the pipeline launch assembly.

The marine pipeline installation vessel of the invention is at least being adapted to carry out the rigid reel lay method. The person skilled in the art makes a distinction between flexible pipes and rigid pipes. Specifications defining rigid pipelines are commonly available and known. Rigid tubular pipes have a minimum bend radius without plastic deformation which is relatively large, e.g. several tens of meters.

The vessel according to the invention comprises vertical storage reels on which tubular pipe is would with plastic deformation.

The vessel is preferably a dynamically-positioned pipe-laying vessel, preferably self-propelled. It is also conceivable that the vessel is not self-propelling, i.e. a pipelaying barge or the like, in which case support vessels such as tugs and supply boats may be required.

In order to support the load of the storage reel on which a rigid pipeline is spooled, the hull construction of the vessel preferably comprises an increased longitudinal strength.

In embodiments, a storage reel with a relatively broad hub is provided, thus capable to store a considerable amount of pipeline. It is conceivable that 10000 mt of pipeline is stored on a single reel. The consequential larger fleet angle of the broad hub is reduced according to the invention by adjustment of the angular position of the storage reel.

In embodiments, the overall mutual distance between the left and right support structures exceeds a half-width of the hull, and is preferably 60-70% of the width of the hull.

The storage reel of the invention is supported by the vessel. It is advantageous for the overall stability of the vessel to mount the at least one vertical storage reel partially submerged in the hull of the vessel. E.g., a reel hold is provided in the hull of the vessel in which the one or more storage reels are held. The left and right support structures defining the horizontal reel axis are provided at a height accommodating the storage reel, preferably a storage reel having a large capacity. See e.g. the hull construction disclosed in U.S. Pat. No. 4,345,855 and U.S. Pat. No. 4,687,376. Alternatively, also according to the invention, it is conceivable that a storage reel of the invention is supported on the deck of the vessel. Alternative vessel designs and alternative locations of the storage reel are also possible.

According to the invention, the vessel comprises at least one vertical storage reel and a pipeline launch assembly. It is common to position the pipeline launch assembly at the rear end of a vessel. Alternatively, in embodiments, the vessel further comprises a moonpool, and is the pipeline launch assembly mounted adjacent the moonpool, allowing the firing line to extend through the moonpool.

In embodiments, a spooling device is provided between the storage reel and the pipeline guide, adjacent the storage reel. Such a spooling device is a pipeline guide that is moveable back and forth in the direction of the horizontal reel axis, across the face of the reel. The spooling device guides the pipeline and keeps the pipeline level on the spool during spooling, ensuring that the pipeline is spooled onto the reel in a uniform and level manner. In embodiments having multiple reels, or different pipelines spooled onto a common reel, comprising an intermediate flange, multiple spooling devices are provided. In particular, each pipeline has an accompanying reel or reel portion and spooling device.

The spooling device may comprise a guide surface provided with guide rollers. In embodiments, the spooling device is supported by the storage reel. For example, the guide surface is supported by a guide cart, travelling across a rail which is supported by at least one support cart that is allowed to travel along a flange of the storage reel. Alternatively, the spooling device is supported by the vessel. For example, the guide surface is supported by an arm, mounted to the hull of the vessel similarly to a wiper blade.

Advantageously, the spooling device is controllable by a spooling control, which is in embodiments tuned to the support structure drive control. It is conceivable that the spooling control occurs manually, and as a consequence tunes the support structure drive control.

The marine pipeline installation vessel comprises a pipeline launch assembly mounted to the vessel downstream of the reel in the direction of unspooling, which pipeline launch assembly is adapted to launch the unwound pipeline in a firing line into the sea.

In embodiments, the pipeline launch assembly is configured as an elongated structure. Preferably, the pipeline launch assembly is embodied as a pipeline launch tower. Possibly, the tower is tiltable tower about a horizontal tower pivot axis, preferably extending perpendicular to the vertical longitudinal mid-plane of the vessel, to adjust the pipe entry angle at which the pipeline enters the water, e.g. as a function of the water depth in which the pipeline is being laid.

The pipeline launch assembly comprises a pipeline guide, preferably mounted at an elevated position to guide unwounded pipeline from the storage reel over the pipeline guide into the firing line. The pipeline guide has an elongated pipeline guide member, e.g. defined by guide rollers. In embodiments, the pipeline guide provides an essentially circular pipeline guide surface, which is also referred to as an aligner wheel. In alternative embodiments, the pipeline guide surface is semi-circular, and frequently referred to as a (deflecting) chute.

In embodiments, the pipeline guide acts as a radius controller, imparting a substantially uniform stress and substantially constant radius of curvature to a pipeline as it is unspooled.

The pipeline guide member is orientated essentially in the direction of the storage reel. Advantageously, the pipeline guide member is movably supported via a pivot connection allowing an angular adjustment of the pipeline guide member. Accordingly, the pipeline guide member is allowed to swivel to the sides of the storage reel, in order to be oriented in line with the pipeline that is being unspooled. An exemplary pivotable chute is disclosed in U.S. Pat. No. 6,371,694.

Similar to the angular position of the storage reel, the angular position of the pipeline guide member can be altered for two reasons: in order to coordinate with the storage reel rotation, thus during spooling the pipeline upon the storage reel or removing the pipeline from the reel in an orderly fashion, and secondly, in order to align with a first or second storage reel, or a left or right storage reel section, as selected by the vessel operators.

Advantageously, the pipeline guide member is controllable by a pipeline guide control, which is in embodiments tuned to the support structure drive control. Even more advantageously, the pipeline guide member, spooling device and support structure drive are controlled by a common control methodology.

A common control methodology of the storage reel drive and the tensioner is commonly applied. Advantageously, this common control methodology is also used to control the pipeline guide member and support structure drive, and possibly the spooling device.

The marine pipeline installation vessel comprises a straightener provided downstream of the storage reel in the direction of unspooling to provide straightening to the rigid pipeline. Preferably, the straightener is provided downstream of the pipeline guide. The straightener may take the form of a series of rollers or tracks, or any other arrangement which imparts sufficient reverse bending force to the rigid pipeline to remove residual curvature so that after unspooling, the pipeline will lay substantially straight on the sea bottom. Commonly known straighteners are three-point straightening devices.

The invention will be elucidated further in relation to the drawings, in which:

FIG. 4 is a top view of the marine pipeline installation vessel of FIG. 1;

Figure 1:
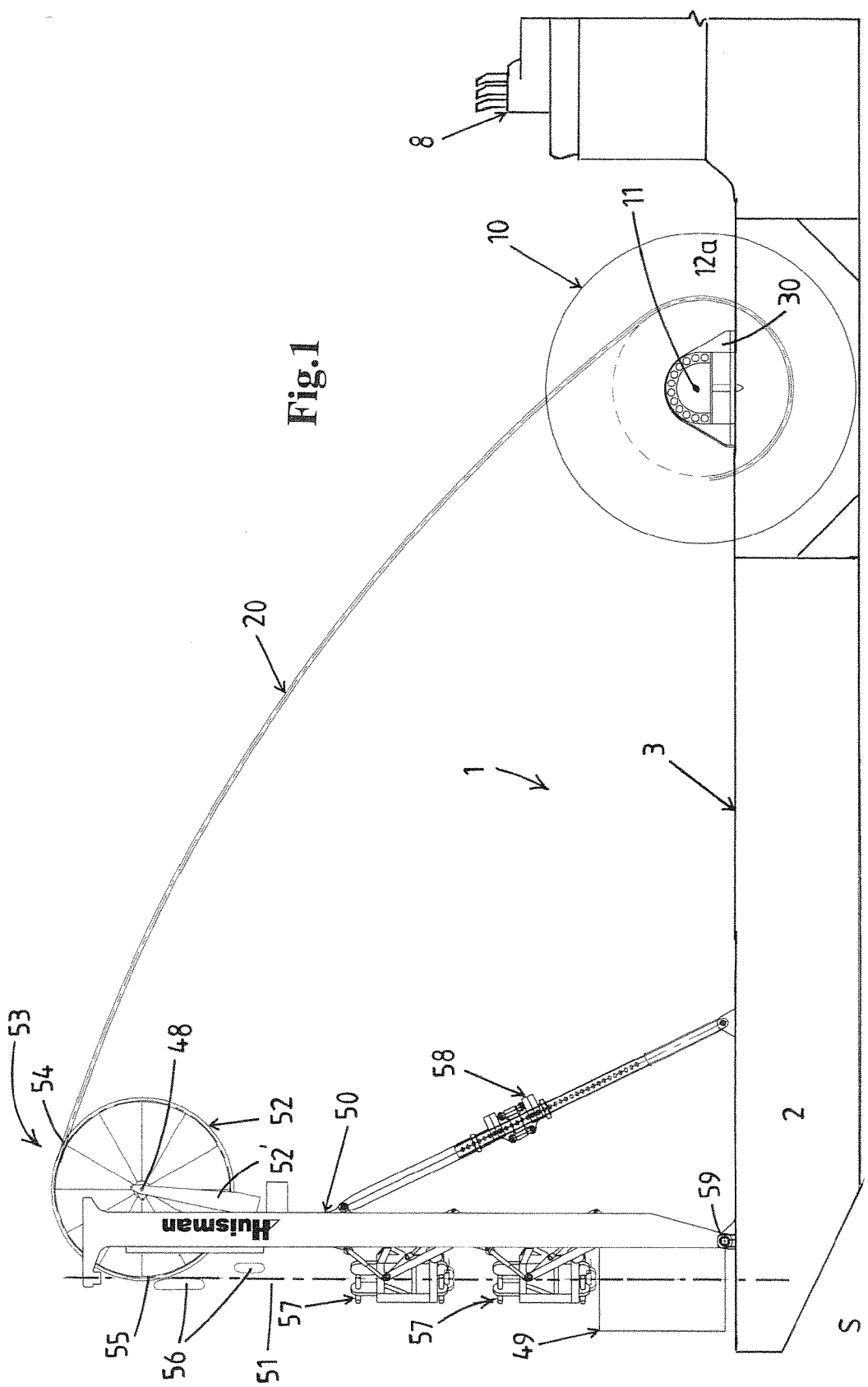
FIG. 1 is a schematical side view of a marine pipeline installation vessel according to the invention.
Figure 2:
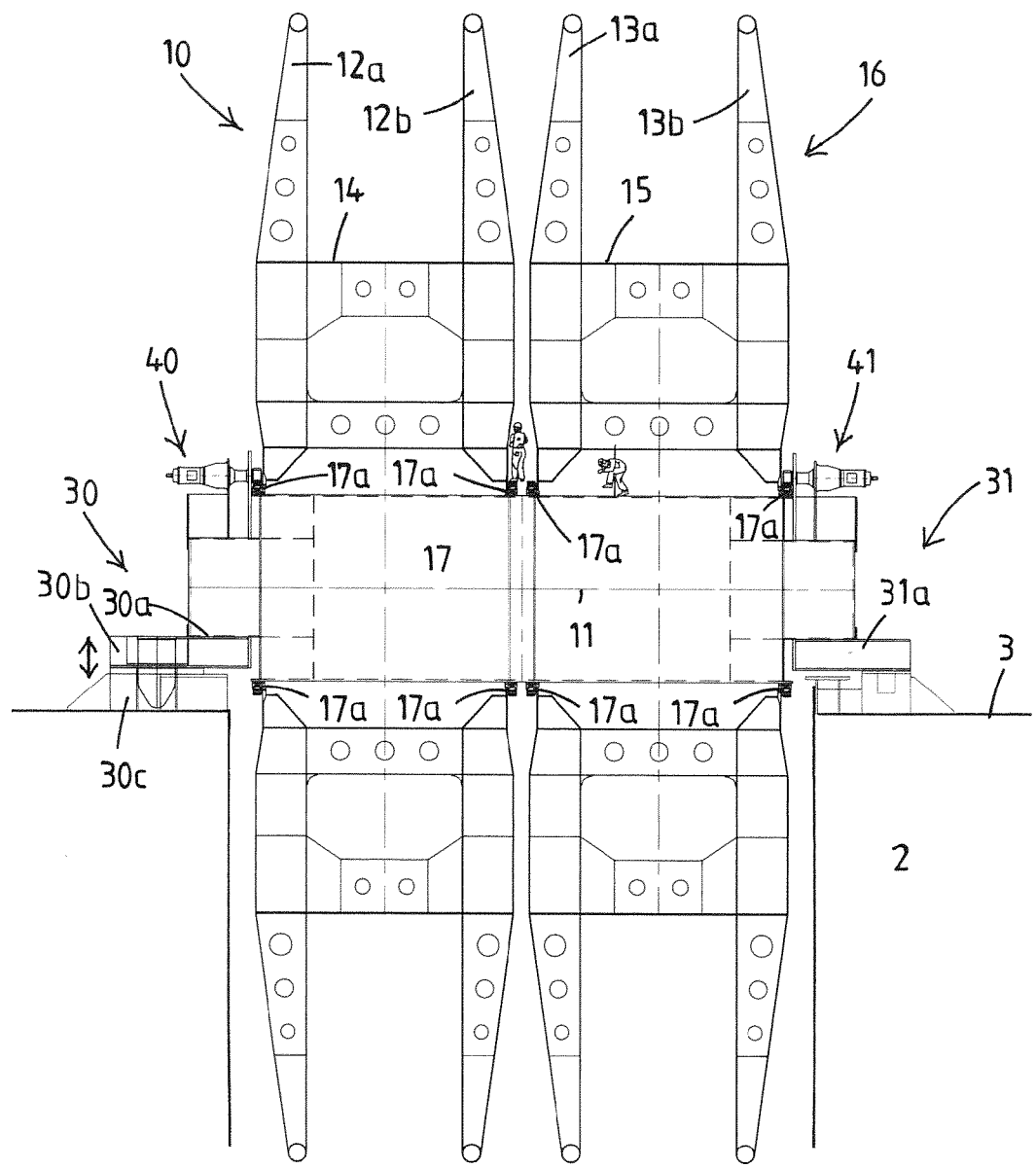
FIG. 2 is a cross-sectional view in the vertical plane through the horizontal reel axis of a storage reel according to the invention.
Figure 3B:
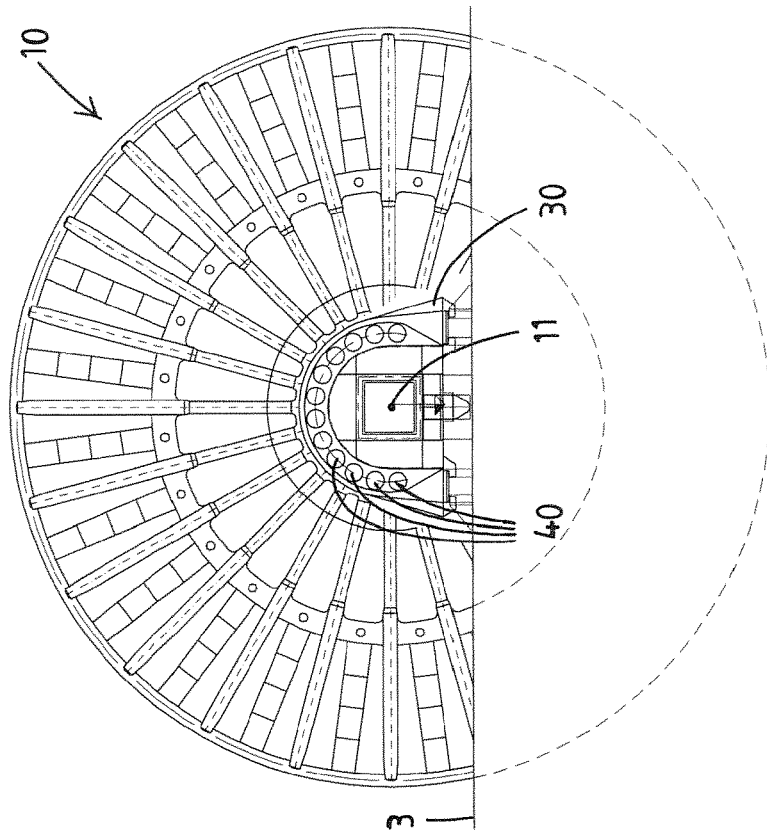
FIG. 3b is a vertical cross-section through the storage reel in the direction of the longitudinal axis of the marine pipeline installation vessel of FIG. 1.
Figure 3A:
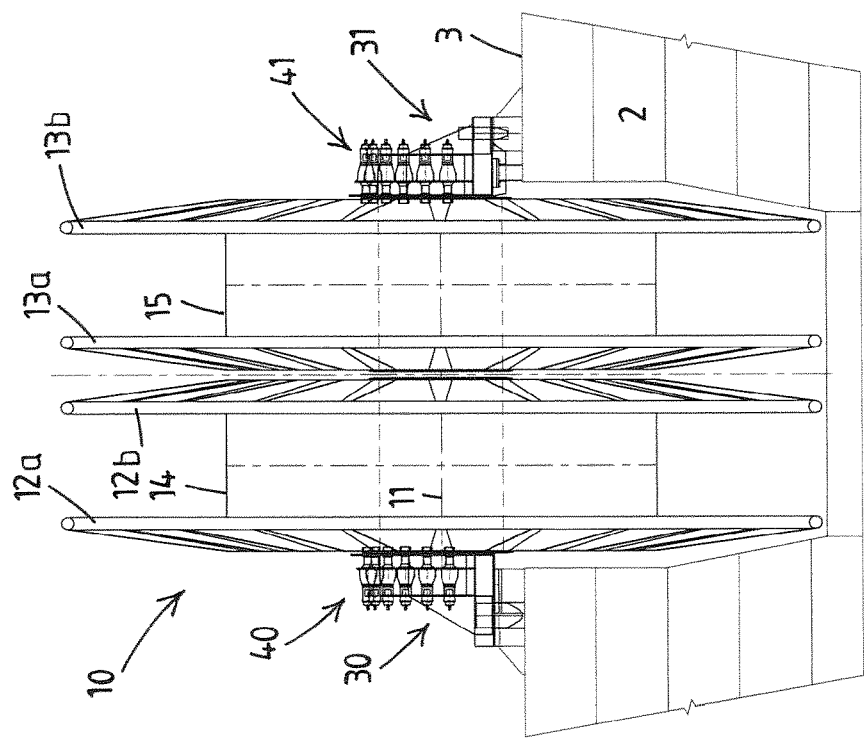
FIG. 3a is a vertical cross-section transverse to the longitudinal axis of the marine pipeline installation vessel of FIG. 1, at the location of the storage reel.

In FIGS. 1-4 a marine pipeline installation vessel 1 for laying an offshore rigid pipeline 20 in the sea S, onto the seabed, is shown, and various details thereof. Said vessel 1 is at least adapted to carry out the rigid reel lay method. The vessel comprises a hull 2 and a deck 3. Partially submerged in the deck of the vessel, in a reel hold 19, are two parallel vertical storage reels 10; 16.

Each storage reel 10; 16 for the storage of a spooled rigid pipeline 20 to be laid is rotatable about a common horizontal reel axis 11, here mounted generally transverse to the longitudinal axis of the vessel L. Each storage reel 10; 16 a left and right vertical flange 12a, 12b; 13a, 13b respectively, between which a hub 14; 15 extends. Onto the hub 14; 15 multiple layers, each comprising several windings of pipeline 20 can be stored. In FIG. 4 just a single winding is shown, in FIGS. 1-3 no pipeline is spooled onto the storage reels.

The two storage reels 10; 16 are independently rotatable and are jointly supported by a left and right reel support structures 30; 31, which are adapted to support the weight of the storage reels and define the horizontal reel axis 11. In the shown embodiment, as visible in particular in FIG. 2, the storage reels 10; 16 are jointly supported by the left and right reel support structures 30; 31 via a common support axle 17. Support axle 17 rests on bearing surfaces 30a, 31a of the reel support structures. In the shown embodiment, the support angle 17 does not rotate, but allows rotation of the hub via bearings 17a. Alternatively, not shown, the two (or more) storage reels are mutually connected via a vertical bearing allowing both storage reels to be independently rotatable. A common support axle may then be dispensed with.

In the shown embodiment, the left and right support structures 30; 31 are supported by the vessel, in particular the deck 3 of the vessel. The support structures allow the storage reels to rotate about the horizontal reel axis 11 via a storage reel drive 40; 41. The shown storage reel drive comprises a number, here 12, of reel drive motors/actuators. For example, the motors have a pinion engaging on a tooth rack provided on the storage reel. Possibly, they are embodied as a rim drive.

In the shown embodiment, the left support structure 30 is also embodied to provide an upward translational movement of the left end of the horizontal reel axis 11. The left support structure comprises a vessel supported portion 30c and a portion 30b comprising bearing surface 30a, which support structure portions 30b, 30c are movable with respect to each other to allow the upward translational movement.

The shown storage reels have a diameter of almost 45-50 meters, and are submerged into the deck for 15 meters. From FIGS. 1 and 3a, it is evident that the storage reel is here maximally submerged. The overall width of the combined storage reels is over 17 meters; the width of a single storage reel, between the outer sides of the flanges, is over 8.5 meters. From the top view of FIG. 4 and FIG. 3a, it is evident that in this embodiment, the overall distance between the left and right support structures 30; 31 exceeds a half-width of the hull, and is here about 80-90% of the width of the hull 2.

In the shown embodiment, at a rear end of the vessel a pipeline launch assembly 50 is mounted to the vessel, here a pipeline launch tower that is pivotably supported by adjusters 58 via a horizontal pivot axis 59, perpendicular to the longitudinal vessel axis L. The pipeline launch tower mounted to the vessel 1 downstream of the reel 10 in the direction of unspooling, and is adapted to launch the unwound pipeline in a firing line 51 into the sea S. At an upper end thereof, the pipeline launch tower comprises a pipeline guide 53, here embodied as an aligner wheel, having an elongated pipeline guide member 52 orientated essentially in the direction of the storage reels and provides an essentially circular pipeline guide surface. The aligner wheel 53 is adapted to guide unwounded pipeline from the storage reel 10 over the aligner wheel 53 into the firing line 51. The pipeline 20 contacts the pipeline guide member 52 at a guide contact point 54 upstream of the firing line and departs said member at a guide departure point 55 into the firing line 51. The aligner wheel 53 is rotable about aligner wheel axis 48.

In the shown embodiment, the pipeline guide member 52 is movably supported by the pipeline launch assembly 50 via a pivot connection 52', allowing an angular adjustment of the pipeline guide member. From FIG. 1, one can derive that a pivoting movement of the pipeline guide member 52 about a horizontal axis perpendicular to the drawing is possible. As such, simultaneous pivoting of the pipeline launch assembly 50 about pivot axis 59 and of the pipeline guide member about a parallel axis is possible.

From FIG. 4, one can also derive that a pivoting movement of the pipeline guide member 52 about a the firing line 51, here perpendicular to the drawing, is possible. As such, an angular adjustment of the pipeline guide member 52 towards the reel is possible. Accordingly, the pipeline guide member 52 is allowed to swivel to the sides of the storage reels, in order to be oriented in line with the pipeline that is being unspooled.

In the shown embodiment a straightener 56 is provided downstream of the aligner wheel 53, and thus downstream of the storage reel 10 in the direction of unspooling to provide straightening to the rigid pipeline. Below the straightener 56, two tensioner 57 are provided which are adapted for engaging the pipeline in the firing line 51 and supporting at least part of the weight of the launched pipeline to control the rate of laying of the rigid pipeline on the seabed. Below the tensioners 57 a workstation 49 is provided. Generally, not shown, a pipeline support device is provided which is adapted to support the weight of the launched pipeline in the firing line. Such a pipeline support device is e.g. embodied as a hang off assembly.

At a front end of the vessel a deck house 8 is visible.

In the top view of FIG. 4, it is visible that the left and right support structures 30; 31 are embodied to form a pivoting structure, as an angular adjustment of the horizontal reel axis 11 about a vertical axis 60 was allowed. Thereby, the angular position of the storage reels 10; 16 can be altered to a first angular position of the storage reel as shown in FIG. 4, in which the fleet angles of the first storage reel 10 are set to a minimum, and a second angular position of the storage reel (not shown) in which the fleet angles of the second storage reel are set to a minimum.

Figure 8:
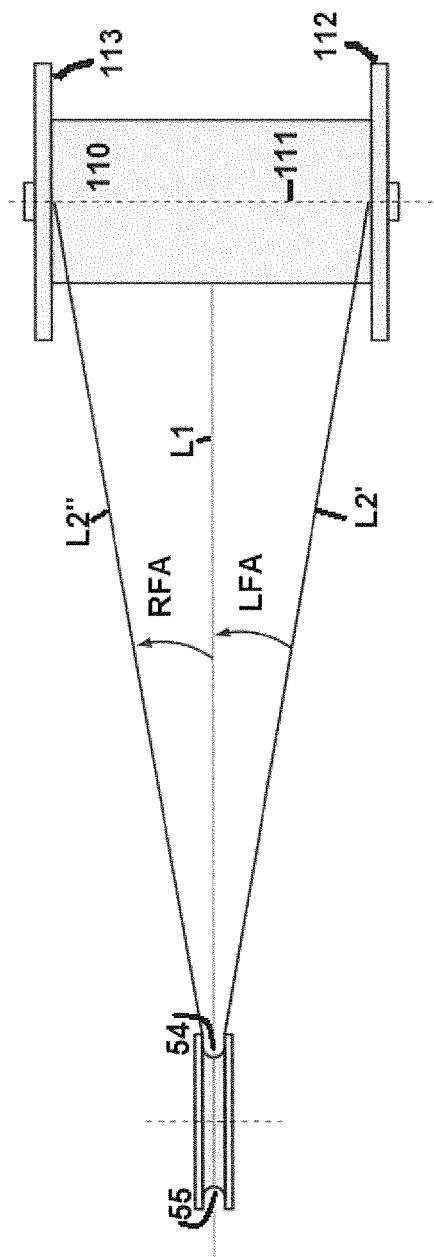
FIG. 8 is a schematic drawing in which the fleet angle is defined.

In FIG. 8 the definition of fleet angle is schematically illustrated. The left and right fleet angle LFA; RFA of a storage reel 110 are defined as the angle between a first line L1 drawn from the guide departure point 55 to the storage reel 110, perpendicular to the reel axis 111, and a second line drawn from the guide departure point 55 to the left and right flange 112; 113, respectively.

In the angular position of the storage reel as shown in FIG. 4, the first line between guide departure point 55 and storage reel 10, perpendicular to the reel axis 11 is inclined with respect to the longitudinal axis of the vessel L, in the direction of the storage reel 10. As a result, the fleet angles of the first storage reel 10 are set to a minimum in this angular position.

The angular position of the storage reel of FIG. 4 is achieved by support structure drive 35, here embodied as a cylinder acting upon support structure 30. The opposite support structure 31 allows a pivotal motion of the horizontal reel axis 11 about vertical axis 60.

Figure 5B:
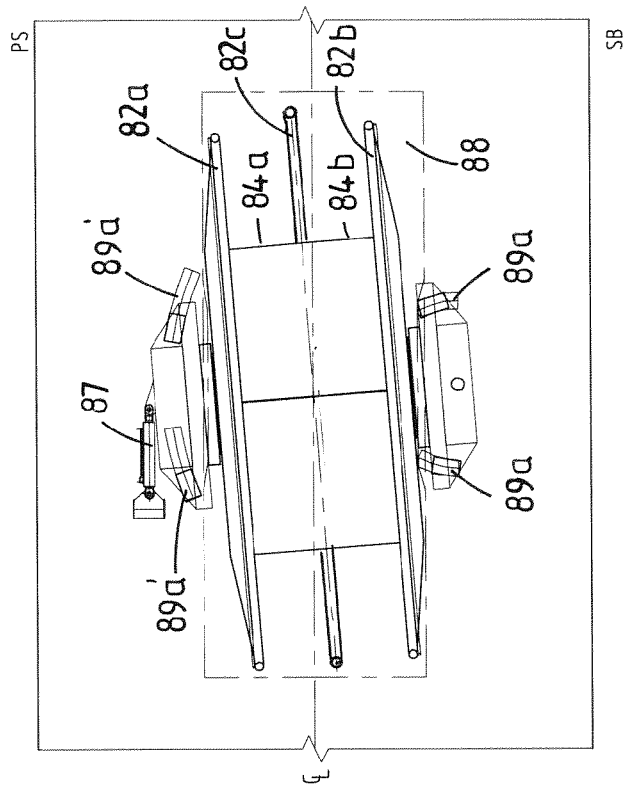
FIGS. 5a and 5b show a schematic top view of a single storage reel according to the invention in two different positions of the storage reel.
Figure 5A:
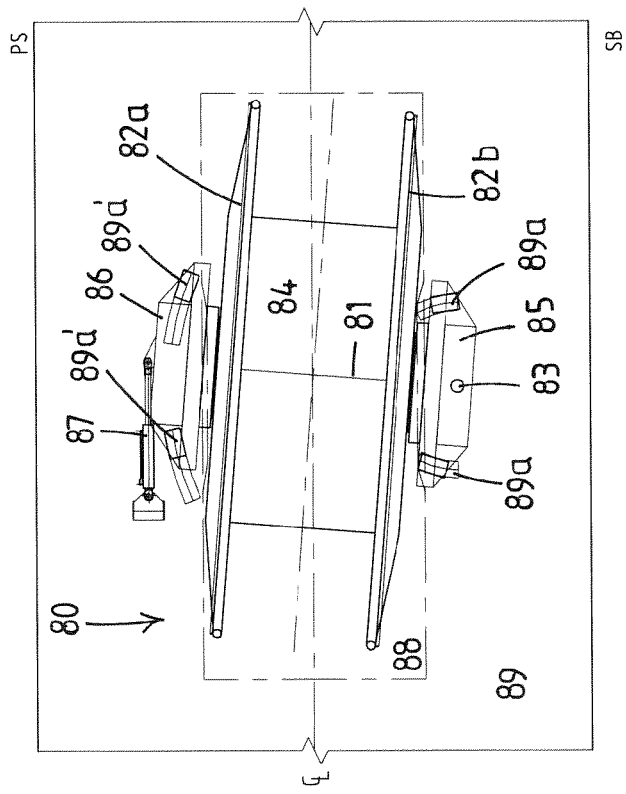

In FIGS. 5a and 5b a storage reel 80 in a reel hold 88 submerged in the hull of a vessel 89 is shown in top view. The storage reel 80 is a single reel for the storage of a spooled rigid pipeline to be laid, which is rotatable about a horizontal reel axis 81 transverse to the longitudinal axis of a vessel according to the present invention, e.g. the vessel of FIG. 1. The storage reel 80 comprises a left and right vertical flange 82a, 82b between which a hub 84 extends. Onto the hub 84 multiple layers, each comprising several windings of pipeline can be stored.

A left and right reel support structure 85; 86 are provided, which are adapted to support the weight of the storage reel 80, and which define the horizontal reel axis 81. The left and right support structures 85; 86 are supported by the vessel adjacent the reel hold 88 on bearing surfaces 89a and 89a'.

In the storage reel position as shown in FIG. 5a, the angular position of the storage reel 80 has pivoted towards the portside (PS) of the vessel 89. Accordingly, storage reel 80 is in a far left angular position in which the right fleet angle is minimized. Hence, unspooling pipeline from positions adjacent the right flange 82b is improved.

In the storage reel position as shown in FIG. 5b, the angular position of the storage reel 80 has pivoted towards the starboard side (SB) of the vessel 89. Accordingly, storage reel 80 is in a far right angular position in which the left fleet angle is minimized. Hence, unspooling pipeline from positions adjacent the left flange 82a is improved.

The angular storage reel positions of FIGS. 5a and 5b are achieved by support structure drive 87, here embodied as a cylinder acting upon support structure 86. The opposite support structure 85 allows a pivotal motion of the horizontal reel axis 81 about vertical axis 83. Advantageously, an active support structure drive control is provided which is adapted to continuously alter the angular position of the storage reel between the angular position of FIGS. 5a and 5b during spooling and/or unspooling the pipeline onto and/or from the storage reel, resulting in an oscillating motion of the storage reel 80.

In FIG. 5b an optional intermediate flange 82c is schematically shown between left and right flange 82a, 82b. The intermediate flange 82c defines a left and a right hub portion of the storage reel 80. The angular adjustment of the horizontal reel axis 81 as shown in FIGS. 5a and 5b allows a movement between a first angular position of the storage reel, shown in FIG. 5b, in which the fleet angles of the left hub portion 84a are set to a minimum. In a second angular position of the storage reel, similar to the angular position of FIG. 5a, the fleet angles of the right hub portion 84b are set to a minimum.

Figure 6B:
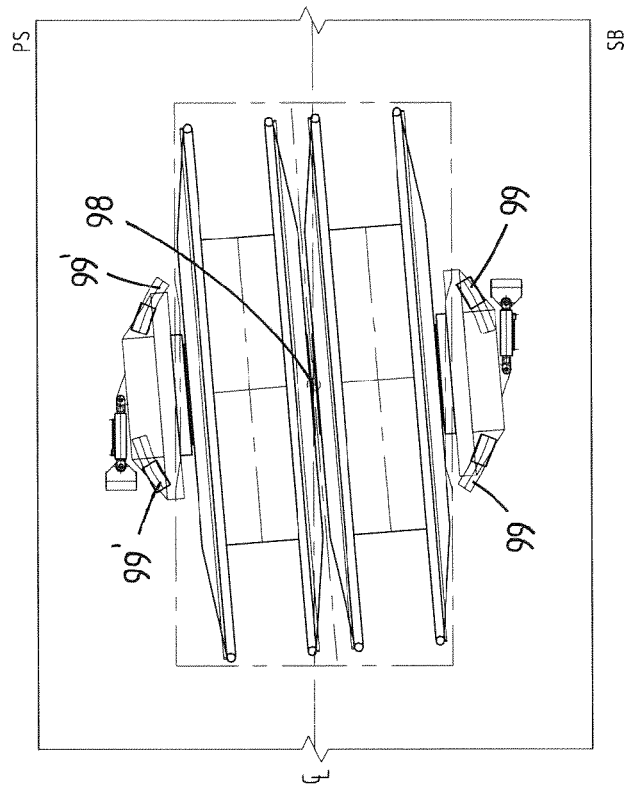
FIGS. 6a and 6b show a schematic top view of two adjacent storage reels according to the invention in two different positions of the storage reels.
Figure 6A:
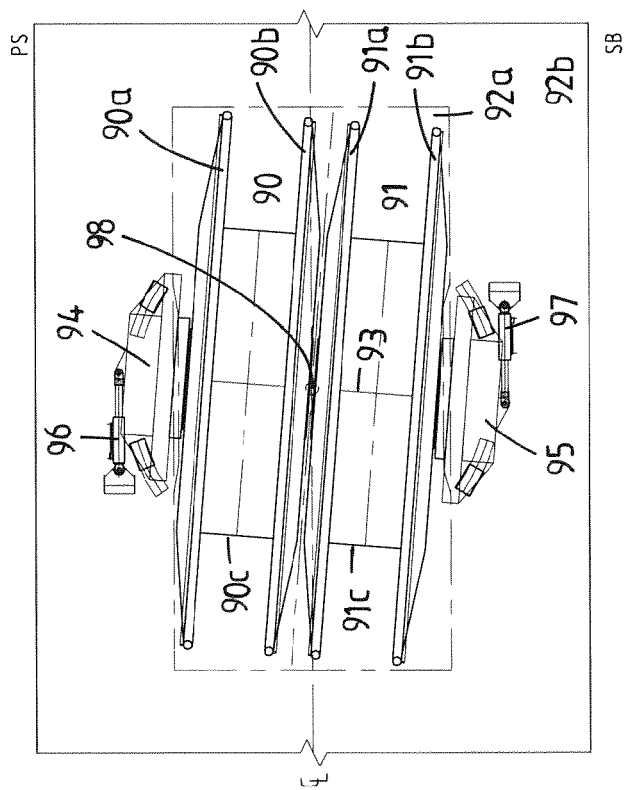

In FIGS. 6a and 6b two storage reels 90; 91 in a reel hold 92a submerged in the hull of a vessel 92b is shown in top view. Storage reels 90,91 are parallel reels for the storage of a spooled rigid pipeline to be laid. The storage reels 90; 91 are preferably independently rotatable about a horizontal reel axis 93 transverse to the longitudinal axis of a vessel according to the present invention, e.g. the vessel of FIG. 1. Each storage reel comprises a left and right vertical flange 90a, 90b; 91a, 91b between which a hub 90c, 91c extends. Onto the hubs multiple layers, each comprising several windings of pipeline can be stored.

A left and right reel support structure 94; 95 are provided, which are adapted to support the weight of both storage reels 90, 91, and which define the horizontal reel axis 93. The left and right support structures 94; 95 are supported by the vessel on bearing surfaces 99; 99' adjacent the reel hold 92a. Alternatively, a linkage mechanism can be provided as a support structure.

In the storage reels positions as shown in FIG. 6a, the angular position of the storage reels 90; 91 has pivoted towards the portside (PS) of the vessel 92b. Accordingly, the storage reels 90; 91 are in a first angular position of the storage reel in which the fleet angles of the right reel 91 are set to a minimum. Hence, unspooling from and spooling pipeline onto the storage reel 91 has improved.

In the storage reel position as shown in FIG. 6b, the angular position of the storage reels 90; 91 has pivoted towards the starboard side (SB) of the vessel 92b. Accordingly, the storage reels 90; 91 are in a second angular position of the storage reel in which the fleet angles of the left reel 90 are set to a minimum. Hence, unspooling from and spooling pipeline onto the storage reel 90 has improved.

The angular storage reel positions of FIGS. 6a and 6b are achieved by two support structure drives 96; 97, here embodied as cylinders acting upon support structures 94; 95 respectively. Accordingly, a pivotal motion of the horizontal reel axis 83 about vertical axis 98 is allowed.

Figure 7:
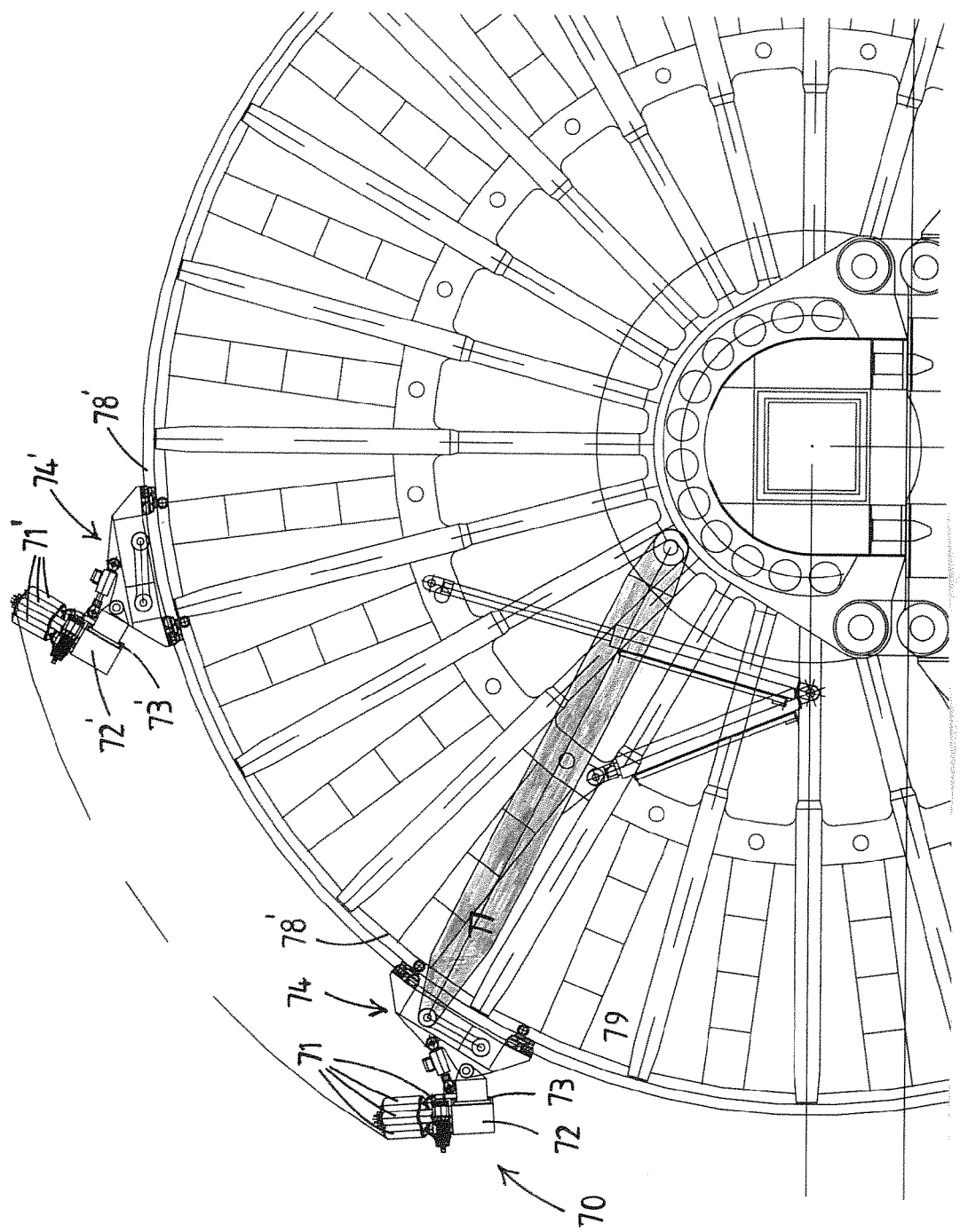
FIG. 7 shows an embodiment of a spooling device.

In FIG. 7, a spooling device 70 according to a preferred aspect of the invention is shown. The spooling device is preferably provided between the storage reel and the pipeline guide, to guide the pipeline and keeps the pipeline level on the spool during spooling, ensuring that the pipeline is spooled onto the reel in a uniform and level manner.

The spooling device 70 of the shown embodiment comprises two support carts 74; 74', being supported by opposed flanges 78; 78' of a storage reel 79. Support cart 74 is supported by storage reel 79 via beam 77. The support carts 74; 74' each comprise a guide surface provided with guide rollers 71; 71'. Here, the guide surface is supported by a guide cart 72; 72', travelling across a rail 73;73' which is supported by at least one support cart 74; 74' that is allowed to travel along a flange 78; 78' of the storage reel 79. Via rail 73; 73' and cart 72; 72', the guide surface of the spooling device 70 is moveable back and forth in the direction of the horizontal reel axis, perpendicular to the drawing. In embodiments, two guide surfaces with guide rollers are supported by a guide cart 72, allowing the pipeline to be guided by opposed sets of guide rollers. Advantageously, the spooling device is controllable by a spooling control, which is in embodiments tuned to the support structure drive control.

The invention claimed is:

1. A marine pipeline installation vessel for laying an offshore rigid pipeline in a sea, onto a seabed, said vessel at least being adapted to carry out a rigid reel lay method, wherein the vessel comprises:
   a hull and a deck;
   at least one vertical storage reel for the storage of a spooled rigid pipeline to be laid, which storage reel is rotatable about a horizontal reel axis; the storage reel comprising:
      a left and right vertical flange between which a hub extends; and
      the hub onto which multiple layers, each comprising several windings of pipeline can be stored;
   a left and right reel support structure adapted to support a weight of the at least one storage reel, defining the horizontal reel axis, which left and right support structures are supported by the vessel;
   a storage reel drive to rotate the storage reel;
   a pipeline launch assembly mounted to the vessel downstream of the storage reel in a direction of unspooling, which pipeline launch assembly is adapted to launch the unwound pipeline in a firing line into the sea, comprising a pipeline guide having an elongated pipeline guide member orientated in a direction of the storage reel and providing a circular or semi-circular pipeline guide surface, which pipeline guide is adapted to guide unwounded pipeline from the storage reel over the pipeline guide into the firing line, wherein said pipeline contacts the pipeline guide member at a guide contact point upstream of the firing line and departs said member at a guide departure point into the firing line, wherein a left and right fleet angle of a storage reel are defined as the angle between a first line drawn from the guide departure point to the storage reel, perpendicular to the reel axis, and a second line drawn from the guide departure point to the left and right flange, respectively;
   a straightener provided downstream of the storage reel in the direction of unspooling to provide straightening to the rigid pipeline;
   at least one tensioner provided downstream of the pipeline guide which is adapted for engaging the pipeline in the firing line and supporting at least part of the weight of the launched pipeline to control a rate of laying of the rigid pipeline on the seabed; and
   a pipeline support device adapted to support the weight of the launched pipeline in the firing line,
   wherein the left and right support structures are embodied to form a pivoting structure allowing an angular adjustment of the horizontal reel axis about a vertical axis to alter an angular position of the at least one storage reel, and wherein at least one support structure drive is provided to controllably adjust the angular position about said vertical axis.

2. The marine pipeline installation vessel according to claim 1, wherein the angular position of the storage reel is adjustable between a far right angular position in which the left fleet angle is minimized, and a far left angular position in which the right fleet angle is minimized.

3. The marine pipeline installation vessel according to claim 2, further comprising an active support structure drive control adapted to continuously alter the angular position of the storage reel during spooling and/or unspooling the pipeline onto and/or from the storage reel, resulting in an oscillating motion of the storage reel.

4. The marine pipeline installation vessel according to claim 1, comprising two storage reels which are jointly supported by the left and right reel support structures, and wherein an angular adjustment of the horizontal reel axis is allowed between a first angular position in which the fleet angles of the first storage reel are set to a minimum, and a second angular position in which the fleet angles of the second storage reel are set to a minimum.

5. The marine pipeline installation vessel according to claim 4, wherein the two storage reels are mutually connected via a vertical bearing allowing both storage reels to be independently rotatable.

6. The marine pipeline installation vessel according to claim 1, comprising two storage reels which are independently rotatable and which are jointly supported by the left and right reel support structures via a common support axle.

7. The marine pipeline installation vessel according to claim 1, comprising one storage reel comprising an intermediate flange defining a left and a right hub portion of the storage reel, and wherein the left and right support structures allow an angular adjustment of the horizontal reel axis between a first angular position of the storage reel in which the fleet angles of the left hub portion are set to a minimum, and a second angular position of the storage reel in which the fleet angles of the right hub portion are set to a minimum.

8. The marine pipeline installation vessel according to claim 1, wherein an overall distance between the left and right support structures exceeds a half-width of the hull.

9. The marine pipeline installation vessel according to claim 1, further comprising a spooling device provided between the storage reel and the pipeline guide.

10. The marine pipeline installation vessel according to claim 1, wherein the pipeline guide member is movably supported via a pivot connection allowing an angular adjustment of the pipeline guide member.

11. The marine pipeline installation vessel according to claim 1, wherein the left and/or right support structure is also embodied to provide an upward translational movement of one or both ends of the horizontal reel axis.

12. A method for rigid reel laying an offshore rigid pipeline on a seabed, said method comprising the step of using the vessel according to claim 1 to lay the offshore rigid pipeline on the seabed.

13. The method according to claim 12, wherein the vessel comprises a single vertical storage reel, comprising the step of continuously altering the angular position of the storage reel during unspooling the multiple layers of several windings of pipeline from the storage reel, between a far right angular position in which the left fleet angle is minimized, and a far left angular position in which the right fleet angle is minimized, resulting in an oscillating motion of the horizontal reel axis.

14. The method according to claim 12, wherein the vessel comprises two storage reels and which are jointly supported by the left and right reel support structures, comprising the step of adjusting the angle of the horizontal reel axis and positioning the storage reels in a first angular position in which the fleet angles of the first storage reel are set to a minimum, and further the step of adjusting the angle of the horizontal reel axis and positioning the storage reels in a second angular position in which the fleet angles of the second storage reel are set to a minimum.

15. The method according to claim 14, wherein after the step of positioning the storage reels in a first or second angular position of the storage reel, the step of continuously altering the angular position of the storage reel is performed during unspooling the multiple layers of several windings of pipeline from the storage reel, resulting in an oscillating motion of the horizontal reel axis.

* * * * *